United States Patent
Akiyama et al.

[11] Patent Number: 5,117,363
[45] Date of Patent: May 26, 1992

[54] ONBOARD NAVIGATION SYSTEM

[75] Inventors: Kazuhiro Akiyama; Takashi Kashiwazaki; Morio Araki; Satoshi Odagawa; Atsuhiko Fukushima, all of Kawagoe, Japan

[73] Assignee: Pioneer Electronic Corporation, Tokyo, Japan

[21] Appl. No.: 556,472

[22] Filed: Jul. 24, 1990

[30] Foreign Application Priority Data
Oct. 11, 1989 [JP] Japan .................. 1-264623

[51] Int. Cl.⁵ .................................. G06F 15/50
[52] U.S. Cl. .................. 364/449; 340/995; 340/990
[58] Field of Search ............ 364/449, 454, 518, 522; 340/990, 995

[56] References Cited
U.S. PATENT DOCUMENTS

| | | | |
|---|---|---|---|
| 4,489,389 | 12/1984 | Beckwith et al. | 364/522 |
| 4,792,907 | 12/1988 | Ikeda et al. | 364/449 |
| 4,896,154 | 1/1990 | Factor et al. | 340/995 |
| 4,924,402 | 5/1990 | Ardo et al. | 364/449 |

Primary Examiner—Thomas G. Black
Attorney, Agent, or Firm—Wegner, Cantor, Mueller & Player

[57] ABSTRACT

An onboard navigation system for displaying a map in a scrolling manner while a mark showing the position of the vehicle is fixed. The system is adapted so that the fixed display position of the mark indicating the vehicle's position can be set at an arbitrary selected position, satisfying a user's demand for viewing a map of an area further ahead of the vehicle in the direction of the vehicle's movement.

4 Claims, 4 Drawing Sheets

ONBOARD NAVIGATION SYSTEM

BACKGROUND OF THE INVENTION

1. Field of the Invention

The present invention relates to an onboard (mounted in a vehicle) navigation system.

2. Description of Background Information

Recently, navigation systems to be mounted in a vehicle have been developed and are entering into a stage of practical application. Those navigation systems are constructed such that digitized map data is previously stored in a memory, map data of a region covering a given area including the present position of the vehicle is read out from the memory while the present position of the vehicle is being recognized, so that a map around the position of the vehicle is displayed on a display, and a "vehicle's position" indicating the present position of the vehicle is automatically indicated in the map being displayed.

In the case of such navigation systems, there are two methods for displaying a positional relationship between the map and the vehicle in which the navigation system is mounted. The first method is such that a map is displayed in a fixed positional relationship relative to the display and the display position of the vehicle is moved relative to the map. Another method is that the display position of the vehicle is fixed at the center of the display and the map is displayed in a scrolling manner. Since the map of a region having a given area around the vehicle's position is displayed, the latter method can always display the map for areas well ahead in the direction of the vehicle's movement, and is considered to be of a higher convenience than the former method.

However, even if the map is moved in a scrolling manner, there is a limitation in the extent of the map displayed ahead of the vehicle in the direction of the vehicle's movement because the size of the display area is limited. Furthermore, there will be a user's demand for viewing the map of an area well ahead of the vehicle in the direction of the vehicle's movement.

SUMMARY OF THE INVENTION

An object of the present invention is to provide an onboard navigation system in which an area of a map displayed ahead of the vehicle in the direction of the vehicle's movement can be arbitrary determined in cases where the map is displayed in a scrolling manner.

An onboard navigation system according to the present invention comprises: present position recognition means for periodically recognizing a present position of the vehicle on the basis of the distance traveled by the vehicle and the direction in which the vehicle travels; map display control means for extracting, from map data storage means, a map data group of a region of a given area centered on the present position recognized by the present position recognition means and supplying the extracted map data group to a display device so as to display a map around the present position of the vehicle; present position display control means for controlling the display device to display a present position mark representing the present position of the vehicle immovably at a center position of the display area, wherein the system is further provided with commanding means for commanding an alteration of the fixed display position of the present position mark; display position setting means for determining a position a predetermined distance displaced from the center position of the display area as a new fixed display position and providing its positional information to the present position display control means during a command period by the commanding means, and center position setting means for determining the position displaced from the center position of the display area by the predetermined distance as the center position and providing its positional information to the map display control means during the command period by the commanding means.

In the onboard navigation apparatus according to the present invention, a map of a region having a predetermined area and centered on a recognized present position is displayed while the present position of the vehicle is being recognized on the basis of the traveled distance and the traveling direction of the vehicle (the direction in which the vehicle travels), and a present position mark indicating the present position of the vehicle is immovably displayed at the center position of the display area. When a command for altering the fixed display position of the present position mark is issued, a position located a predetermined distance away from the center of the display area is obtained as a new fixed display position of the present position mark, and a map of a region having a predetermined area centered on the position located a predetermined distance displaced from the recognized position is displayed.

BRIEF DESCRIPTION OF THE DRAWINGS

FIGS. 4A and 4B are flowcharts showing the manner of displaying the vehicle position mark in the new fixed display position, in which FIG. 4A shows a state where the target position is not set, and FIG. 4B shows a state where the target position is set.

DETAILED DESCRIPTION OF A PREFERRED EMBODIMENT

The embodiment of the present invention will be explained in detail hereinafter with reference to the accompanying drawings.

Figure 1:
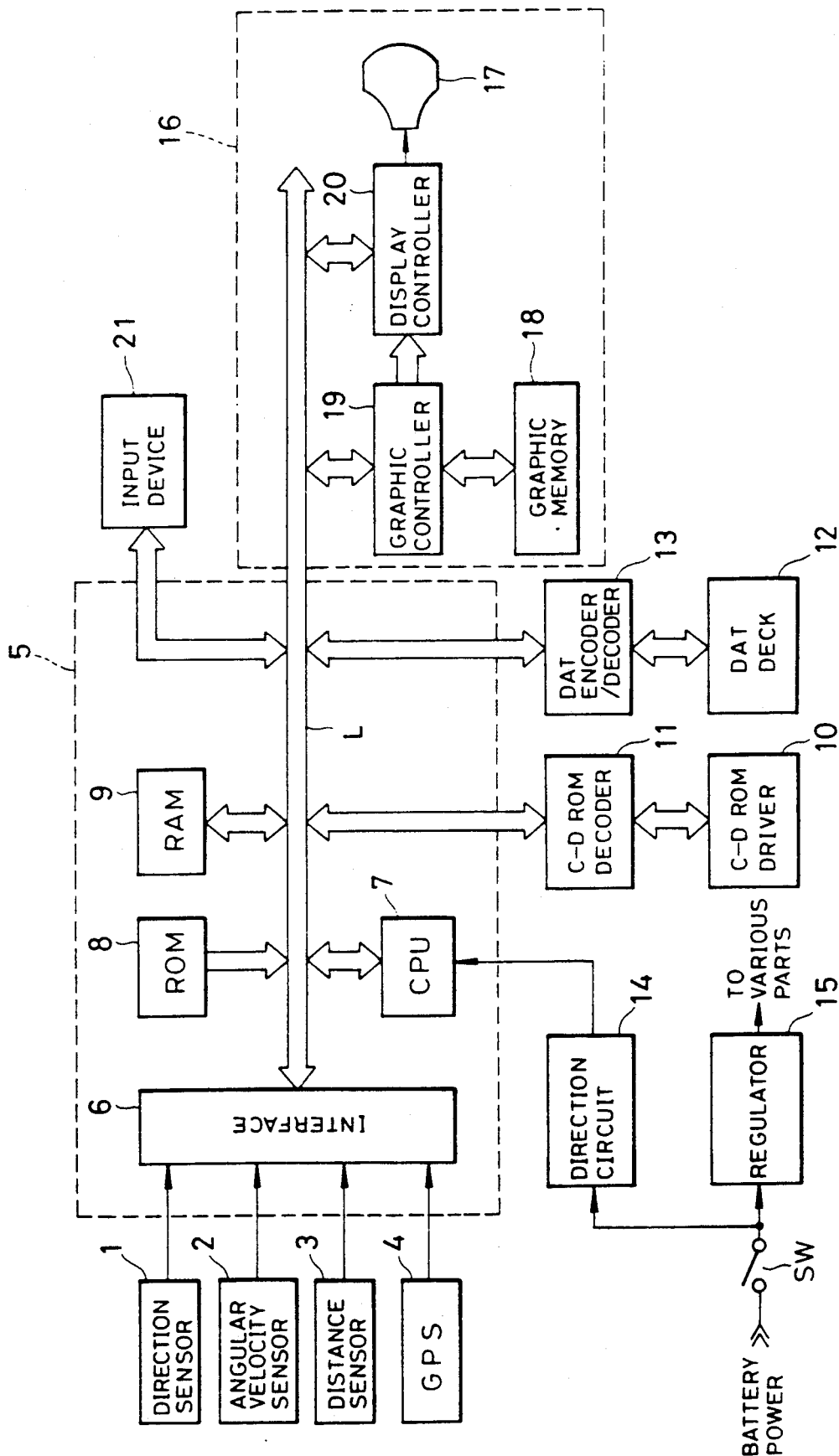
FIG. 1 is a block diagram showing an onboard navigation system according to the present invention.

FIG. 1 is a block diagram showing an example of the construction of the onboard navigation system according to the present invention. In the figure, the numeral 1 denotes a direction sensor which detects the vehicle's traveling direction (the direction in which the vehicle travels) on the basis of the terrestrial magnetism (magnetic field of the earth), for example. The reference numeral 2 denotes a distance sensor for sensing the traveling distance of the vehicle and the reference numeral 4 denotes a GPS (Global Positioning System) for detecting the present position of the vehicle from longitudinal and latitudinal information, etc. Detection outputs of these sensors and systems are supplied to a system controller 5.

The system controller 5 is made up of the following various elements. Namely, an interface 6 receives the detection outputs from the sensors (or system) 1 through 4 and performs processes such as an A/D (Analog to Digital) conversion. A CPU (Central Processing Unit) 7 performs the calculation of the traveling distance of vehicle and the traveling direction of the vehicle, coordinates (longitude and latitude) of the present position, and so on, on the basis of output of the sensors (or the system) 1 through 4 supplied from the interface 6 sequentially. A ROM (Read Only Memory) 8 stores various processing programs of the CPU 7 and other necessary information beforehand, and a RAM (Random Access Memory) 8 stores information necessary for executing programs and allows both writing and reading of such information.

As an external memory device, the system is for example provided with a CD- (Compact Disc) ROM and a DAT (Digital Audio Tape), the former operating as a read-only non-volatile storage medium and the latter operating as a nonvolatile storage medium allowing both writing and reading. Furthermore, a nonvolatile storage medium such as an IC card can be used in place of the CD-ROM or the DAT as the external memory device. In the CD-ROM digitized (in the numerical form) map data is stored previously. The information recorded on the CD-ROM is read-out by a CD-ROM driver 10. A read output signal of the CD-ROM driver 10 is decoded by a CD-ROM decoder 11, and in turn transmitted to a bus line L.

On the other hand, the DAT is used as a so-called backup memory, and recording and reading of information is performed by a DAT deck 12. When the power of the vehicle is turned off, information such as the coordinate of the present position of the vehicle stored in the RAM 9 immediately before is supplied, as a backup data, to the DAT deck 12 through a DAT encoder/decoder 13. Upon throw-in of the power of the vehicle, the information stored on the DAT is read out by the DAT deck, and transmitted to the bus line L through the DAT encoder/decoder 13 so that the information read out is stored in the RAM 9.

On and off state of the power of the vehicle is monitored by means of a detection circuit 14 which monitors the output level of the so-called accessory switch SW of the vehicle. The vehicle power from a storage battery (not shown) passed through the accessory switch SW is stabilized by means of a regulator 15 and supplied as an electric power of various parts of the apparatus. Owing to the time constant of the circuit, the output signal of the regulator 15 will not fall immediately. During the last transition period, backup data is stored into the DAT operating as the backup memory.

In response to a timer interrupt, the CPU 7 calculates, when the vehicle is running, the direction of the vehicle's movement on the basis of the output data of the direction sensor 1. At the same time, in response to an interrupt generated every time the vehicle travels a predetermined distance on the basis of the output signal of the distance sensor 3, the CPU 7 determines the coordinates of the present position of the vehicle on the basis of the traveled distance and the traveling direction of the vehicle. Then the CPU 7 gathers map data of a region covering a given area including the coordinates of the present position from the CD-ROM, and stores the gathered data in the RAM 9 operating as buffer memory, and supplies them to a display unit 16. As the method for detecting the traveling direction of the vehicle on the basis of the output signal of the direction sensor 1, a method disclosed in Japanese Patent Provisional Publication No. 62-130013 may be used.

Figure 2:
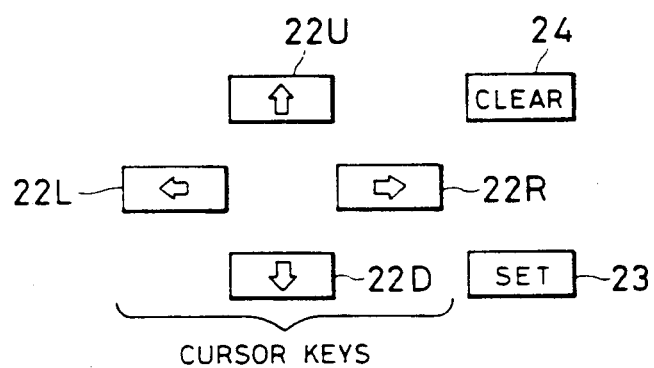
FIG. 2 is a plan view showing a part of a key-arrangement in an input device.

The display unit 16 is made up of a display 17 such as a CRT, a graphic memory 18 made up of a V(Video)-RAM for example, a graphic controller 19 which draws the map data supplied from the system controller 5 in the graphic memory 18 as image data, and outputs this image data, and a display controller 20 which performs control operations to display a map on the CRT display 17 on the basis of image data issued from the graphic controller 19. An input device 21 such as a keyboard is provided, so that various commands are supplied to the system controller 5 in accordance with the key entry by a user. For instance the key board may include four cursor keys 22, a set key 23, and a clear key 24, wherein the cursor keys 22 being arranged in a manner as shown in FIG. 2 and used for a fine adjustment of distance in altering the fixed display position of the vehicle position mark and for the input of a target position.

Figure 3:
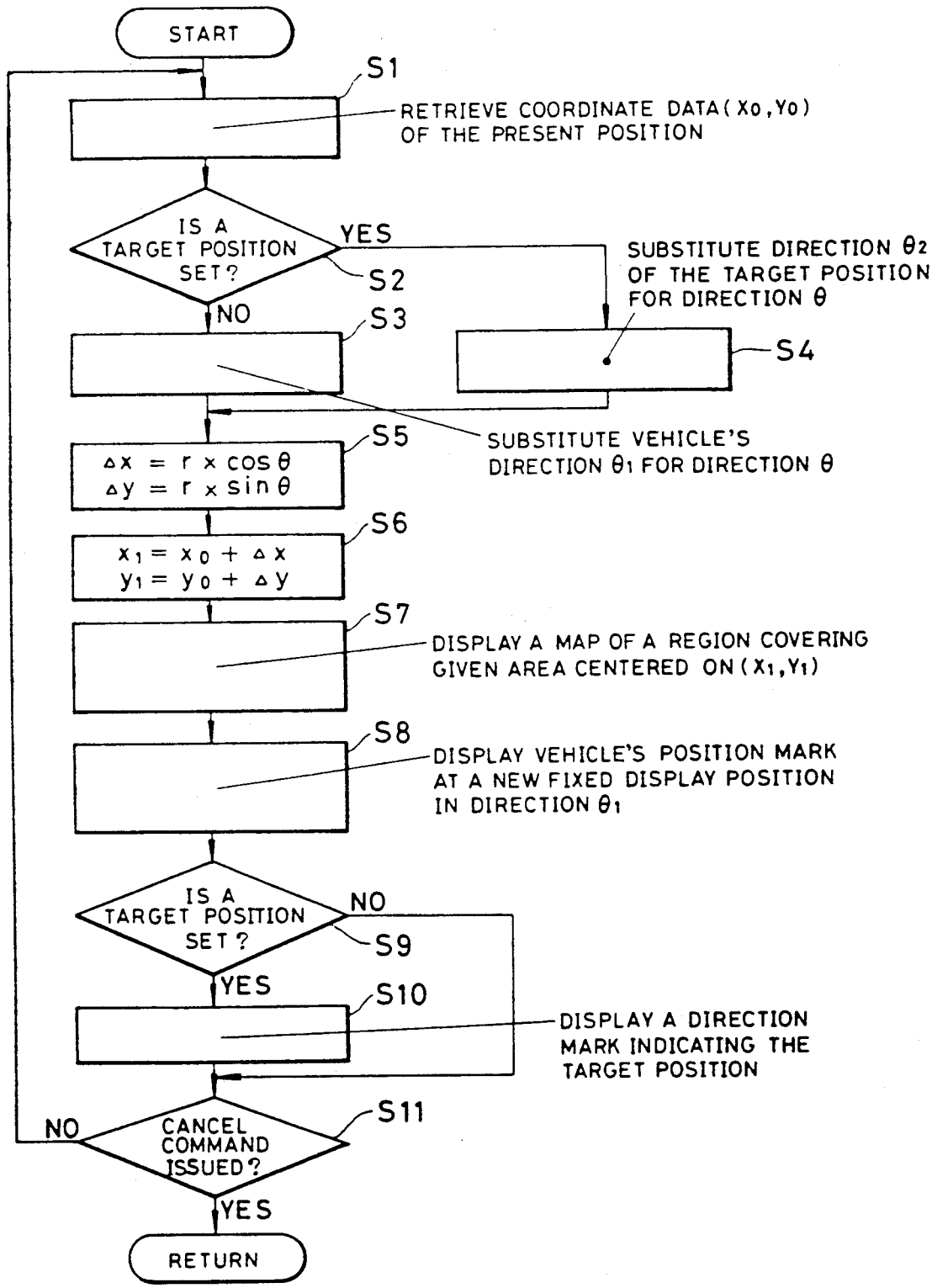
FIG. 3 is a flowchart showing the procedure of a process for altering the fixed display position of a vehicle position mark.

Referring to the flowcharts of FIG. 3, the procedure of selecting points performed by the CPU 7 will be explained hereinafter. This subroutine is called and executed when a command for altering the fixed display position of the vehicle position mark is generated by a key entry in the input device 21, during the execution of the main routine (not shown). Briefly, the main routine includes processes to read map data of a region of a given area centered on a present position while recognizing the present position of the vehicle, and to display them on the display 17 as a map around the present position of the vehicle. Furthermore, the main routine includes a process to display the vehicle position mark on the center position of the display area, so as to display the present position of the vehicle while maintaining an actual positional relationship between the map and the vehicle position.

When the command for altering the fixed display position of the vehicle position mark is generated from the input device 21, the CPU 7 retrieves position coordinate data $(x_0, y_0)$ of the present position which is derived by the recognition of the present position of the vehicle (step S1), and judges whether or not a target position has been set (step S2). The setting of the target position is performed, for example, in the following manner. The input device 21 is operated so that the cursor in the display image is moved to a target position on the map by using four cursor keys 22 shown in FIG. 2, and the set key 23 is pressed subsequently. If the target position has not been set, the CPU 7 substitutes the present traveling direction of the vehicle generated on the basis of the output data of the direction sensor 1, i.e., the vehicle's direction $\theta_1$ for the direction $\theta$ for determining the altered fixed display position (step S3). If the target position has been set, the CPU 7 substitutes the direction $\theta_2$ of the target position from the present position for the direction $\theta$, the direction $\theta_2$ being obtained on the basis of the position coordinates of the present position and the position coordinates of the target position (step S4).

Then, the CPU 7 determines a direction for setting a new fixed display position with respect to the center position of the display area, on the assumption that the new fixed display position is set on a position a predetermined distance r away from the center position of the display area, i.e., position coordinates $(\Delta x, \Delta y)$ on a circle having a radius of the predetermined distance r, according to the following equation by using the direction $\theta$ (step S5).

$$\Delta x = r \times \cos \theta$$

$$\Delta y = r \cdot \sin \theta$$

Then, the CPU 7 determines center coordinates ($x_1$, $y_1$) of a new image obtained as a result of the alteration of the fixed display position of the vehicle position mark, according to the equation described below by using the coordinates ($x_0$, $y_0$) of the present position and the coordinates ($\Delta x$, $\Delta y$) of the new fixed display position (step S6).

$$x_1 = x_0 - \Delta x$$

$$y_1 = y_0 - \Delta y$$

Subsequently, the CPU 7 reads from the CD-ROM a map data group of a region having a given area whose a center position is placed on the center coordinates ($x_1$, $y_1$) obtained for the new image, and displays them on the display 17 as a new map as a result of the alteration of the fixed display position of the vehicle position mark (step S7). Furthermore, the CPU 7 displays a vehicle position mark Ma on the new fixed display position so that it indicates the vehicle's direction $\theta_1$ (step S8).

Then, the CPU 7 again judges whether or not a target position has been set (step S9). If the target position has been set, the CPU 7 displays a direction mark Mb in the form of arrow for example for indicating the direction of the target position (step S10). Subsequently, if the target position has not been set, the CPU 7 directly proceeds to step S11 in which it judges whether or not a cancel command for canceling the alteration of the fixed display position of the vehicle position mark. If the cancel command is not issued, the CPU 7 repeats the processes described above until the cancel command is issued. Conversely, if the cancel command is issued, the CPU 7 returns to the main routine.

Figure 4A:
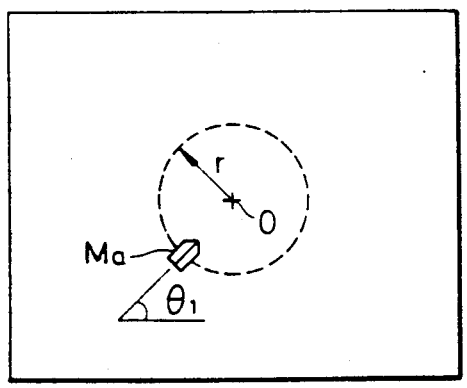
Figure 4B:
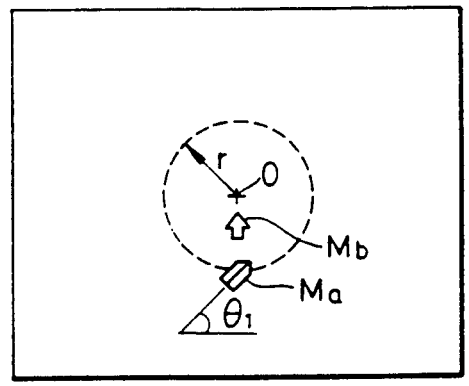

The above-described procedures for altering the fixed display position of the vehicle position mark can be summarized as follows. When the target position is not set, the vehicle position mark Ma is displayed fixedly on a position displaced from the center position O of the display area by the predetermined distance r in a direction opposite to the direction of the vehicle's movement, in such a manner as to indicate the vehicle's direction $\theta_1$ as illustrated in FIG. 4A. When the target position has been set, the vehicle position mark Ma is displayed fixedly on a position displaced from the center position O of the display area by the predetermined distance r in a direction opposite to the direction of the target position, in the manner to indicate the vehicle's direction $\theta_1$ as shown in FIG. 4B. Furthermore, the direction of the target position is displayed by means of the direction mark Mb at the same time.

Figure 5:
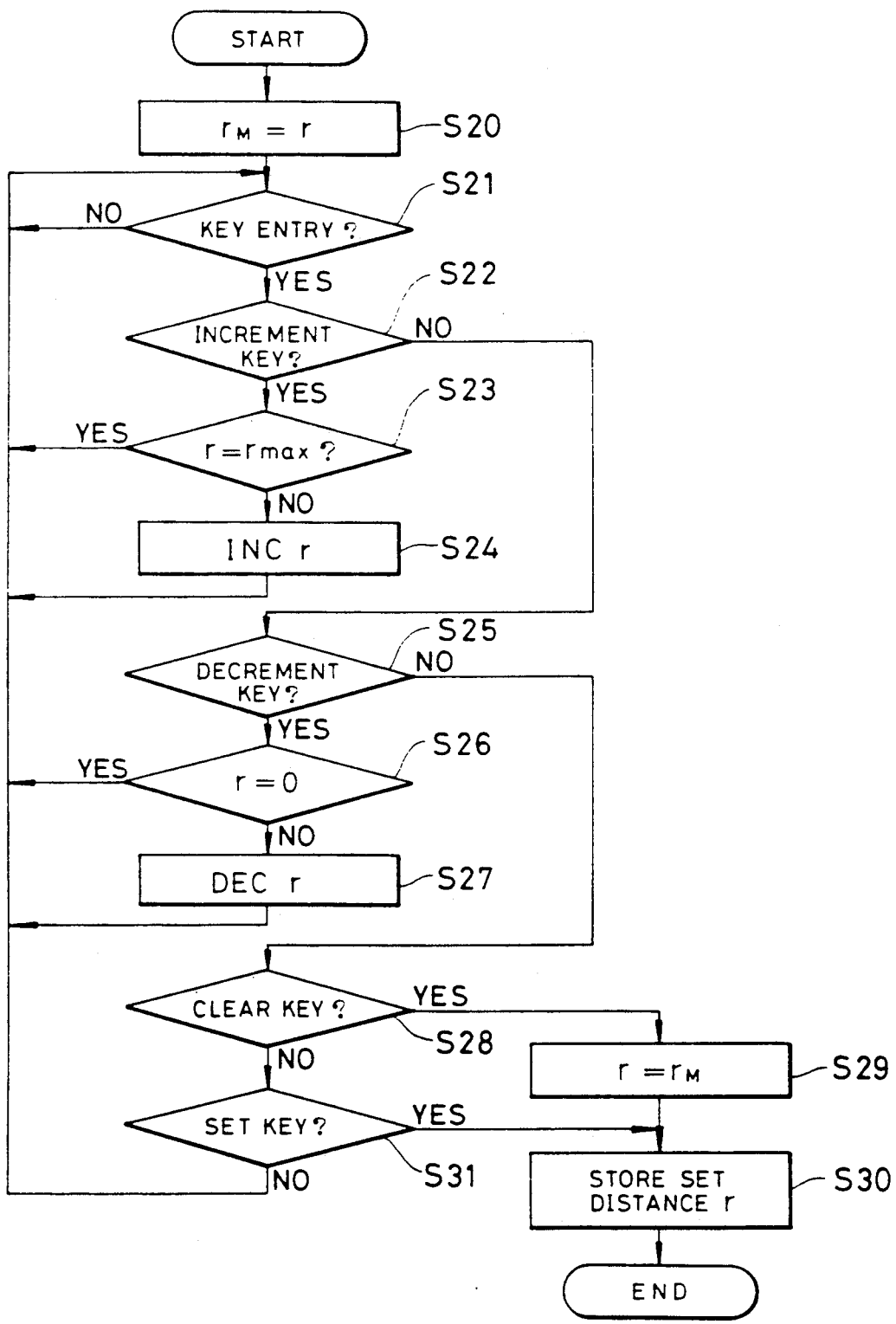
FIG. 5 is a flowchart showing the procedure of a process for adjusting a distance r.

The predetermined distance r may be set arbitrary to any value, and a procedure for adjusting the value of the distance r will be described with reference to the flowchart of FIG. 5. The adjustment of the distance r is performed by pressing a distance adjustment selection command key (not shown) provided in the input device, and subsequently designating an increment or decrement of the distance r by using the key 22L or 22R of the cursor keys 22 shown in FIG. 2.

When an adjustment selection command for the distance r is issued from the input device 21, the CPU 7 at first substitutes a previous value rM for the distance r (step S20). Then, the CPU 7 judges whether or not there is a key entry (step S21). If there is a key entry, the CPU judges whether the operated key is the key for designating the increment or the key for designating the decrement (step S22). If the key for the increment is operated, then the CPU 7 judges whether the distance presently set equals a maximum distance rmax. If r≠rmax, the CPU 7 increases the distance r by a unit distance (step S24). If it is judged in step S24 that the key entry is not by the increment key, the CPU 7 judges whether or not the key entry is through the decrement key (step S25). If the decrement key is operated, the CPU 7 further judges whether or not the distance is equal to zero (step S26). If r≠0, the CPU 7 decreases the distance r by the unit distance (step S27).

If the key entry is neither through the increment key nor decrement key, the CPU 7 judges whether or not the key entry is through the clear key (step S28). If the clear key is operated, the CPU 7 sets the distance r back to the previous value rM (step S29), and stores it in memory (step S30). By this operation, the sequence for adjusting the distance r is completed.

Furthermore, if the key entry is not by the clearly, the CPU 7 judges whether or not the key entry is through the set key for commanding a completion of the adjustment of the distance (step S31). If the set key is operated, the distance r obtained by the adjustment is stored in memory (step S30), and the sequence of operations for adjusting the distance r will is completed by this operation. If the set key is not operated, the CPU 7 returns step S21, to repeat the operations described above. When it is judged in step S21 that there is no key entry, when it is judged in step S23 that the distance r equals the distance rmax (r=rmax), or the process for increasing the distance r in step S24 is completed, or when it is judged that the distance r equals zero (r=0) in step S26, or the process for decreasing the distance in step S27 is completed, the program directly returns to step S21. The distance r stored in memory in step S30 will be used for the process for altering the fixed display position of the vehicle position mark which has been explained with reference to FIG. 3.

As explained in the foregoing, the onboard navigation system according to the present invention is constructed to perform operations summarized as follows. Basically, a mark indicating the present position of the vehicle as well as a map of a region covering a given area centered on the present position being recognized is displayed while recognizing the present position on the basis of the distance traveled by the vehicle and the vehicle's traveling direction, the mark indicating the present position of the vehicle being displayed at a center position of the display area. When a command for altering the fixed display position of the present position mark, a position which is a predetermined distance displaced from the center of the display area is selected as a new position for the fixed display of the present position mark during the command period. At the same time, a map of a region converting a given area centered on the position which is displaced by the predetermined distance from the present position being recognized is displayed. Therefore, when the map is to be displayed in the scrolling manner the display range of a map area ahead of the vehicle in the direction of the vehicle's movement can be set arbitrary, so that the apparatus can suffice the user's demand to see the map of an area further ahead of the vehicle.

What is claimed is:

1. In an onboard navigation system including:

present position recognition means for periodically recognizing a present position of a vehicle in which the system is mounted on the basis of a distance traveled by the vehicle and a vehicle's traveling direction;

map display control means for extracting, from map data storage means, a map data group of a region of a given area centered on the present position recognized by the present position recognition means and supplying the extracted map data group to a display device so as to display a map around of the present position of the vehicle;

present position display control means for controlling the display device to display a present position mark representing the present position of the vehicle immovably at a center position of the display area, wherein the improvement comprises:

commanding means for commanding an alteration of the fixed display position of the present position mark;

display position setting means for determining a position a predetermined distance displaced from the center position of the display area as a new fixed display position and providing its positional information to the present position display control means during a command period by the commanding means, and center position setting means for determining the position displaced from the center position of the display area by the predetermined distance as the center position and providing its positional information to the map display control means during the command period by the commanding means, wherein said display position setting means determines a direction for setting said new fixed display on the basis of the vehicle's traveling direction.

2. A system as claimed in claim 1, further comprising distance setting means for setting said predetermined distance at an arbitrary selected value.

3. In an onboard navigation system including:

present position recognition means for periodically recognizing a present position of a vehicle in which the system is mounted on the basis of a distance traveled by the vehicle and a vehicle's traveling direction;

map display control means for extracting, from map data storage means, a map data group of a region of a given area centered on the present position recognized by the present position recognition means and supplying the extracted map data group to a display device so as to display a map around of the present position of the vehicle;

present position display control means for controlling the display device to display a present position mark representing the present position of the vehicle immovably at a center position of the display area, wherein the improvement comprises:

commanding means for commanding an alteration of the fixed display position of the present position mark;

display position setting means for determining a position a predetermined distance displaced from the center position of the display area as a new fixed display position and providing its positional information to the present position display control means during a command period by the commanding means, and center position setting means for determining the position displaced from the center position of the display area by the predetermined distance as the center position and providing its positional information to the map display control means during the command period by the commanding means, and further comprising target position input means for inputting a target position, wherein said display position setting means determines a direction for setting said new fixed display position with respect to said center position of the display area on the basis of a direction of said target position from said present position recognized by the present position recognition means.

4. A system as claimed in claim 3, further comprising distance setting means for setting said predetermined distance at an arbitrary selected value.

* * * * *